United States Patent
Sharma et al.

(10) Patent No.: US 11,915,380 B2
(45) Date of Patent: Feb. 27, 2024

(54) METHOD FOR ANIMATING CLOTHES FITTING

(71) Applicant: PERFITLY, LLC., New York, NY (US)

(72) Inventors: Dave Sharma, New York, NY (US); Kash Vyas, Chatham, NJ (US); Navin Rao, Edgewater, NJ (US)

( * ) Notice: Subject to any disclaimer, the term of this patent is extended or adjusted under 35 U.S.C. 154(b) by 468 days.

(21) Appl. No.: 16/599,081

(22) Filed: Oct. 10, 2019

(65) Prior Publication Data

US 2020/0126316 A1  Apr. 23, 2020

Related U.S. Application Data

(60) Provisional application No. 62/748,081, filed on Oct. 19, 2018.

(51) Int. Cl.
*G06T 19/20* (2011.01)
*G06T 17/20* (2006.01)
(Continued)

(52) U.S. Cl.
CPC .......... *G06T 19/20* (2013.01); *G06F 3/04815* (2013.01); *G06T 17/20* (2013.01);
(Continued)

(58) Field of Classification Search
CPC ..... G06T 19/20; G06T 17/20; G06T 2200/24; G06T 2219/2012; G06T 2219/2024; G06F 3/04815
See application file for complete search history.

(56) References Cited

U.S. PATENT DOCUMENTS

| 9,870,646 B2 | 1/2018 | Khalili et al. |
| 9,905,019 B2 | 2/2018 | Applegate et al. |

(Continued)

FOREIGN PATENT DOCUMENTS

| WO | 2017203262 A2 | 11/2017 |
| WO | 2018029670 A1 | 2/2018 |

(Continued)

OTHER PUBLICATIONS

International Search Report, dated Jan. 9, 2020, for corresponding PCT Application No. PCT/US2019/055730, International Filing Date Oct. 10, 2019, consisting of 2 pages.

(Continued)

*Primary Examiner* — Michelle Chin
(74) *Attorney, Agent, or Firm* — Gearhart Law, LLC; David Postolski

(57) ABSTRACT

Systems and methods are provided for generating digital clothing on custom digital avatars. The method includes generating 3-dimensional (3D) representations of one or more garments, wherein the 3D representations of the one or more garments include physical attributes of one or more garment materials, enabling the 3D representations to move and lay on the custom digital avatars in a realistic manner. The method further includes inputting one or more data points for a user, wherein the one or more data points include body measurements of the user, generating, using a processor, a custom digital avatar for the user, wherein the custom digital avatar is configured to approximately conform to the one or more data points, selecting, using a graphical user interface, one or more garments having an accompanying 3D representation; and digitally displaying, using the graphical user interface, the selected one or more garments on the custom digital avatar.

16 Claims, 10 Drawing Sheets

(51) Int. Cl.
  *G06F 3/0481* (2022.01)
  *G06F 3/04815* (2022.01)
(52) U.S. Cl.
  CPC .. *G06T 2200/24* (2013.01); *G06T 2219/2012* (2013.01); *G06T 2219/2024* (2013.01)

(56) References Cited

U.S. PATENT DOCUMENTS

| | | | |
|---|---|---|---|
| 2002/0138170 | A1 | 9/2002 | Onyshkevych et al. |
| 2009/0222127 | A1* | 9/2009 | Lind .................. G06Q 30/0601 705/26.1 |
| 2015/0154691 | A1* | 6/2015 | Curry ....................... G06F 30/23 705/27.2 |
| 2015/0279098 | A1 | 10/2015 | Kim et al. |
| 2015/0324103 | A1 | 11/2015 | Tepmongkol et al. |
| 2016/0035061 | A1 | 2/2016 | Gadre et al. |
| 2016/0078663 | A1* | 3/2016 | Sareen ................. G06V 40/103 345/419 |
| 2016/0275599 | A1 | 9/2016 | Adeyoola et al. |
| 2016/0284018 | A1 | 9/2016 | Adeyoola et al. |
| 2016/0292779 | A1 | 10/2016 | Rose et al. |
| 2017/0124747 | A1 | 5/2017 | Knowlton |
| 2017/0351246 | A1 | 12/2017 | Colaianni et al. |
| 2017/0372515 | A1 | 12/2017 | Hauswiesner et al. |
| 2018/0012420 | A1 | 1/2018 | Ngo Ngoc et al. |
| 2018/0130112 | A1* | 5/2018 | Gerson .............. G06Q 30/0643 |
| 2019/0266778 | A1* | 8/2019 | Aluru ....................... G06T 17/10 |

FOREIGN PATENT DOCUMENTS

| | | |
|---|---|---|
| WO | 2018048902 A1 | 3/2018 |
| WO | 2018052367 A1 | 3/2018 |

OTHER PUBLICATIONS

Written Opinion, dated Jan. 9, 2020, for corresponding PCT Application No. PCT/US2019/055730, International Filing Date Oct. 10, 2019, consisting of 4 pages.

* cited by examiner

METHOD FOR ANIMATING CLOTHES FITTING

CLAIM OF PRIORITY

This application is a United States utility application having priority to U.S. provisional application Ser. No. 62/748,081, filed Oct. 19, 2018 entitled PERFITLY AR/VR PLATFORM, the entirety of which is hereby incorporated by reference as if fully set forth herein.

FIELD OF THE EMBODIMENTS

This invention relates to the generation of digital clothing and, in particular, to generating garments having physical attributes on custom-generated digital avatars and be able to view the results on an electronic device or in a holographic space.

BACKGROUND OF THE EMBODIMENTS

When purchasing clothing, the ultimate goal is to obtain garments that look nice, fit the body of the wearer, and appropriately lay over the body of the wearer in a manner that coincides with the wearer's preferences and style. For example, a garment may physically fit over the wearer's body but, once worn, lays awkwardly or unattractively and unsatisfactorily to a wearer. Because of this, many shoppers physically travel to clothing stores so that they can physically try on the clothing to determine whether the clothing appropriately looks according to, and fits, the user's style, preference, and unique body.

Since this method of trying on clothes is not available for online purchases, many online shoppers purchase multiple garments online in various sizes, colors, prints, and styles. This leads to the unacceptable pieces being returned to the seller. Even when digital representations of the wearers, or "avatars", are used, users cannot see how the specific garment would realistically fall or look on an avatar having the dimensions of the user.

For at least these reasons, a means of enabling users to digitally determine how clothing of certain materials, sizes, colors, or prints would realistically look on an avatar of the dimensions of a user is needed.

Examples of related art are described below:

U.S. Pat. No. 9,870,646 generally describes a 3D model generation engine that is programmed to generate a 3D model of a piece of clothing based on a number of 2D images of the piece of clothing. Specifically, the 3D model is generated by deforming a 3D model template using control points that are automatically pinned to different locations of a representation of the piece of clothing on the 2D image(s). The 3D model template includes multiple bisectional planes. Each bisectional plane has multiple vertices and 3D control points. At least one 2D image of the piece of clothing is obtained, and different locations on the 2D image are determined for several 2D control points. The 3D model template is modified by deforming the bisectional planes (and its associated vertices) of the 3D model template based on the determined location of the 2D control points on the 2D image.

U.S. Pat. No. 9,905,019 generally describes virtual apparel fitting systems configured to perform methods comprising generating a plurality of garment images for a garment based on a single digital image of the garment, wherein each garment image corresponds to a different size of the garment; generating a user image for a user based on a digital photograph of the user; receiving a selection comprising the garment; in response to receiving the selection comprising the garment, generating an image of the user wearing the garment based on an alignment of garment fit points in one garment image of the plurality of garment images with corresponding user fit points in the user image; and transmitting the image of the user wearing the garment to the user's computing device for display in a graphical user interface.

U.S. Patent Publication No. 2015/0279098 generally describes a smart terminal, a virtual experience providing server and methods of the same. The smart terminal determines avatar identification information to identify a user avatar and clothing identification information to identify digital clothing and displays a virtual experience image overlaid with the digital clothing simulated on the user avatar, provided from the virtual experience providing server.

U.S. Patent Publication No. 2015/0324103 generally describes a system comprising a software application which can be installed on communications devices to create a social network to share the appearances of an exclusive social group as represented by avatars dressed in virtual clothing and exchanging social commentary on same. Avatars, virtual clothing, and social commentary, as well as various combinations thereof are stored in a virtual closet. Personal looks are created in a virtual dressing room and a determination made as to how clothes fit using fitting algorithms. Infrastructure for a social network is provided wherein comments, opinions, advice, recommendations, and other such information related to personal looks can be exchanged in real time or by messages and data files to be read at a later time. Also included are means to ensure the privacy of an avatar. Also included are a means to estimate physical characteristics of clothing and from a virtual clothing representation.

U.S. Patent Publication No. 2016/0275599 generally describes methods for generating and sharing a virtual body model of a person, created with a small number of measurements and a single photograph, combined with one or more images of garments. The virtual body model represents a realistic representation of the user's body and is used for visualizing photo-realistic fit visualizations of garments, hairstyles, make-up, and/or other accessories. The virtual garments are created from layers based on photographs of real garment from multiple angles. Furthermore the virtual body model is used in multiple embodiments of manual and automatic garment, make-up, and, hairstyle recommendations, such as, from channels, friends, and fashion entities. The virtual body model is sharable for, as example, visualization and comments on looks. Furthermore it is also used for enabling users to buy garments that fit other users, suitable for gifts or similar. The implementation can also be used in peer-to-peer online sales where garments can be bought with the knowledge that the seller has a similar body shape and size as the user.

U.S. Patent Publication No. 2016/0292779 generally describes techniques for modifying a garment based on gestures. An access module can access a first set of sensor data from a first sensor, and a second set of sensor data from a second sensor. A garment simulation module can generate a three-dimensional (3D) garment model of a garment available for sale draped on an avatar based on the first set of sensor data and the second set of sensor data. A display module can cause a presentation, on a display of a device, of the 3D garment model draped on the avatar. Additionally, the garment simulation module can determine a modification gesture associated with the 3D garment model draped on the avatar based on the first set of sensor data and the second set of sensor data. Furthermore, the garment simulation module can modify the 3D garment model based on the determined modification gesture.

U.S. Patent Publication No. 2017/0124747 generally describes methods for capturing digital data representing skin of a subject. An avatar representing the skin is generated from the digital data. An enhanced avatar is generated by digitally revising a contour of the skin of the body. A digital garment configured to enhance contours of the skin of the body is rendered from the enhanced avatar. The digital garment comprises material having numerous zones, and each zone is configured with material comprising a contouring force and/or a pigment pattern corresponding to a region of the skin corresponding to the zone. A corrective garment is generated from the digital garment, and the corrective garment is configured for wear to cover one or more regions of the skin of the body. The corrective garment is configured to aesthetically enhance the body.

U.S. Patent Publication No. 2017/0372515 generally describes methods in which, in a process for generating garment model data representative of a piece of garment, input image data containing a view of the piece of garment are processed. A type of wearing condition is determined as at least one of a first type of worn garment and of a second type of not-worn garment. If the first type is determined, a shape of the piece of garment and a shape of the person wearing the garment are identified utilizing an active contour modelling approach based on a preset body model. The identified shapes are adapted based on a garment template model. The garment model data are determined from the input image data based on the adapted identified shapes. If the second type is determined, a shape of the piece of garment is identified. The input image data are iteratively compared with a respective garment template model to identify at least one matching garment template model. The identified shape is aligned with a shape of the at least one matching garment template model and the garment model data are determined from the input image data based on the identified shape and on results of the aligning.

U.S. Patent Publication No. 2018/0012420 generally describes a computer-implemented method for designing a virtual garment or upholstery (G) in a three-dimensional scene comprising the steps of: a) providing a three-dimensional avatar (AV) in the three-dimensional scene; b) providing at least one pattern (P) of said virtual garment or upholstery in the three-dimensional scene; c) determining a distance field from a surface of the avatar; d) positioning the pattern relative to the avatar by keeping a fixed orientation with respect to said distance field; and e) assembling the positioned pattern or patterns around the avatar to form said virtual garment or upholstery, and draping it onto the avatar. A computer program product, non-volatile computer-readable data-storage medium and Computer Aided Design system for carrying out such a method. Application of the method to the manufacturing of a garment or upholstery.

International Patent Publication No. WO2017203262A2 generally describes a computer implemented method for predicting garment or accessory attributes using deep learning techniques, comprising the steps of: (i) receiving and storing one or more digital image datasets including images of garments or accessories; (ii) training a deep model for garment or accessory attribute identification, using the stored one or more digital image datasets, by configuring a deep neural network model to predict (a) multiple-class discrete attributes; (b) binary discrete attributes, and (c) continuous attributes, (iii) receiving one or more digital images of a garment or an accessory, and (iv) extracting attributes of the garment or the accessory from the one or more received digital images using the trained deep model for garment or accessory attribute identification. A related system is also provided.

International Patent Publication No. WO2018029670A1 generally describes a system, device, and method of image processing, particularly utilizing machine learning and computer vision. A user selects a particular shirt from an online catalog; and instead of seeing an image of the shirt on the shelf or being worn by a model, the system generates and shows to the user an image of that particular shirt being virtually dressed by that particular user. The user requests the system to show search results for blue pants; and instead of producing generic images of blue pants, on the shelf or worn by various models, the system generates user-tailored search results that shown various types of blue pants being virtually worn by the user himself, or virtually worn by a particular other person that is selected by the user. The system enhances the product image by correcting it and by adding realistically-looking shading and wrinkles.

International Patent Publication No. WO2018048902A1 generally describes a system, platform, device and method for an apparatus, system, and method to facilitate personalized online shopping. In some embodiments, a method is provided for personalized shopping that includes the steps of: running a personalized shopping assistant application on a mobile user computing device to access product matching data from one or more product data sources; running the personalized shopping assistant application on the mobile user computing device to acquire anatomical data about one or more application users, based on anatomical data capture from one or more image capture sources; running the personalized shopping assistant application generate a personalized user shopping avatar based on the anatomical data capture of at least a selected part of the user anatomy; and running the personalized shopping assistant application to match one or more products from the one or more product data sources to one or more personalized user shopping avatars.

International Patent Publication No. WO2018052367 generally describes a garment digitization system and method for deriving geometric dimensions of a digital representation of a garment. In a described embodiment, the system 450 comprises (i) a physical mannequin 452 having adjustable spatial configuration to fit the garment 404a to form a reconfigured mannequin having altered geometric dimensions; (ii) an image capturing device 454 for capturing an image of the reconfigured mannequin wearing the garment 404a; (iii) a digitization module 458 arranged to digitize the garment 404a from the captured image to form a digital representation of the garment 404a; and a calculation module arranged to derive geometric dimensions of the garment 404a from the altered dimensions of the reconfigured mannequin; and the derived geometric dimensions are stored in association with the digital representation of the garment 404a. A garment try-on system and method are also disclosed.

None of the art described above addresses all of the issues that the present invention does.

SUMMARY OF THE EMBODIMENTS

According to an aspect of the present invention, a method for generating digital clothing on custom digital avatars is provided. The method includes generating 3-dimensional (3D) representations of one or more garments, wherein the 3D representations of the one or more garments include physical attributes of one or more garment materials, enabling the 3D representations to move and lay on the custom digital avatars in a realistic manner. The method further includes inputting one or more data points for a user, wherein the one or more data points include body measurements of the user, generating, using a processor, a custom digital avatar for the user, wherein the custom digital avatar is configured to approximately conform to the one or more data points, selecting, using a graphical user interface, one or more garments having an accompanying 3D representation; and digitally displaying, using the graphical user interface, the selected one or more garments on the custom digital avatar.

It is an object of the present invention to provide the method for generating digital clothing on custom digital avatars, wherein the generating further includes uploading one or more clothing templates to one or more servers.

It is an object of the present invention to provide the method for generating digital clothing on custom digital avatars, wherein the generating further includes digitally interconnecting two or more of the one or more clothing templates.

It is an object of the present invention to provide the method for generating digital clothing on custom digital avatars, wherein the generating further includes adding one or more embellishments to the 3D representations.

It is an object of the present invention to provide the method for generating digital clothing on custom digital avatars, wherein the one or more embellishments are selected from the group comprising: colors; imagery; zippers; tags; buttons; thread color; trim; snaps; collar stays; and logos.

It is an object of the present invention to provide the method for generating digital clothing on custom digital avatars, wherein the method further includes creating, using the graphical user interface, a user profile on a digital application, wherein the one or more data points are input into the user profile.

It is an object of the present invention to provide the method for generating digital clothing on custom digital avatars, wherein the one or more data points further include data points selected from the group consisting of: facial features; hair style; hair color; skin tone; musculature; piercings; jewelry; and tattoos.

It is an object of the present invention to provide the method for generating digital clothing on custom digital avatars, wherein the inputting further includes uploading one or more images or video files, analyzing the one or more images or video files, and determining the one or more data points based on the analysis of the one or more images or video files.

It is an object of the present invention to provide the method for generating digital clothing on custom digital avatars, wherein the inputting further includes manually inputting, using the graphical user interface, the one or more data points.

It is an object of the present invention to provide the method for generating digital clothing on custom digital avatars, wherein the inputting further includes scanning a body of the user using a laser scanner or an infrared scanner, and determining the one or more data points based on the scan. According to an embodiment, the scanning may comprise scanning one or more photographs (or video) of the user, and using these photographs (or video) to determine one or more measurements of the user.

According to another aspect of the present invention, a system for generating digital clothing on custom digital avatars is provided. The system includes one or more servers, comprising: a memory, configured to: receive and store one or more data points for a user, wherein the one or more data points include body measurements of the user; and a processor, configured to: generate 3-dimensional (3D) representations of one or more garments, wherein the 3D representations of the one or more garments include physical attributes of one or more garment materials, enabling the 3D representations to move and lay on the custom digital avatars in a realistic manner; and generate a custom digital avatar for the user, wherein the custom digital avatar is configured to approximately conform to the one or more data points. The system further includes one or more electronic devices, comprising: a processor; a memory; and a graphical user interface including a display, the graphical user interface being configured to: select one or more garments having an accompanying 3D representation; and digitally display the selected one or more garments on the custom digital avatar.

It is an object of the present invention to provide the system for generating digital clothing on custom digital avatars, wherein the memory is further configured to receive and store one or more clothing templates.

It is an object of the present invention to provide the system for generating digital clothing on custom digital avatars, wherein the processor if further configured to digitally interconnect two or more of the one or more clothing templates.

It is an object of the present invention to provide the system for generating digital clothing on custom digital avatars, wherein the processor, in generating the 3D representations, if further configured to add one or more embellishments to the 3D representations.

It is an object of the present invention to provide the system for generating digital clothing on custom digital avatars, wherein the one or more embellishments are selected from the group comprising: colors; imagery; zippers; tags; buttons; thread color; trim; snaps; collar stays; and logos.

It is an object of the present invention to provide the system for generating digital clothing on custom digital avatars, wherein the one or more electronic device is configured to enable a user to create, using the graphical user interface, a user profile on a digital application, wherein the one or more data points are input into the user profile.

It is an object of the present invention to provide the system for generating digital clothing on custom digital avatars, wherein the one or more data points further include data points selected from the group consisting of: facial features; hair style; hair color; skin tone; musculature; piercings; jewelry; and tattoos.

It is an object of the present invention to provide the system for generating digital clothing on custom digital avatars, wherein the one or more servers is configured to receive one or more images or video files, analyze, using the processor, the one or more images or video files, and determine the one or more data points based on the analysis of the one or more images or video files.

It is an object of the present invention to provide the system for generating digital clothing on custom digital avatars, wherein the graphical user interface is further configured to enable the user to manually input the one or more data points.

It is an object of the present invention to provide the system for generating digital clothing on custom digital avatars, wherein the one or more electronic devices further includes a laser scanner or an infrared scanner configured to scan a body of the user, and wherein the one or more servers is further configured to determine the one or more data points based on the scan.

DESCRIPTION OF THE PREFERRED EMBODIMENTS

Figure 1:
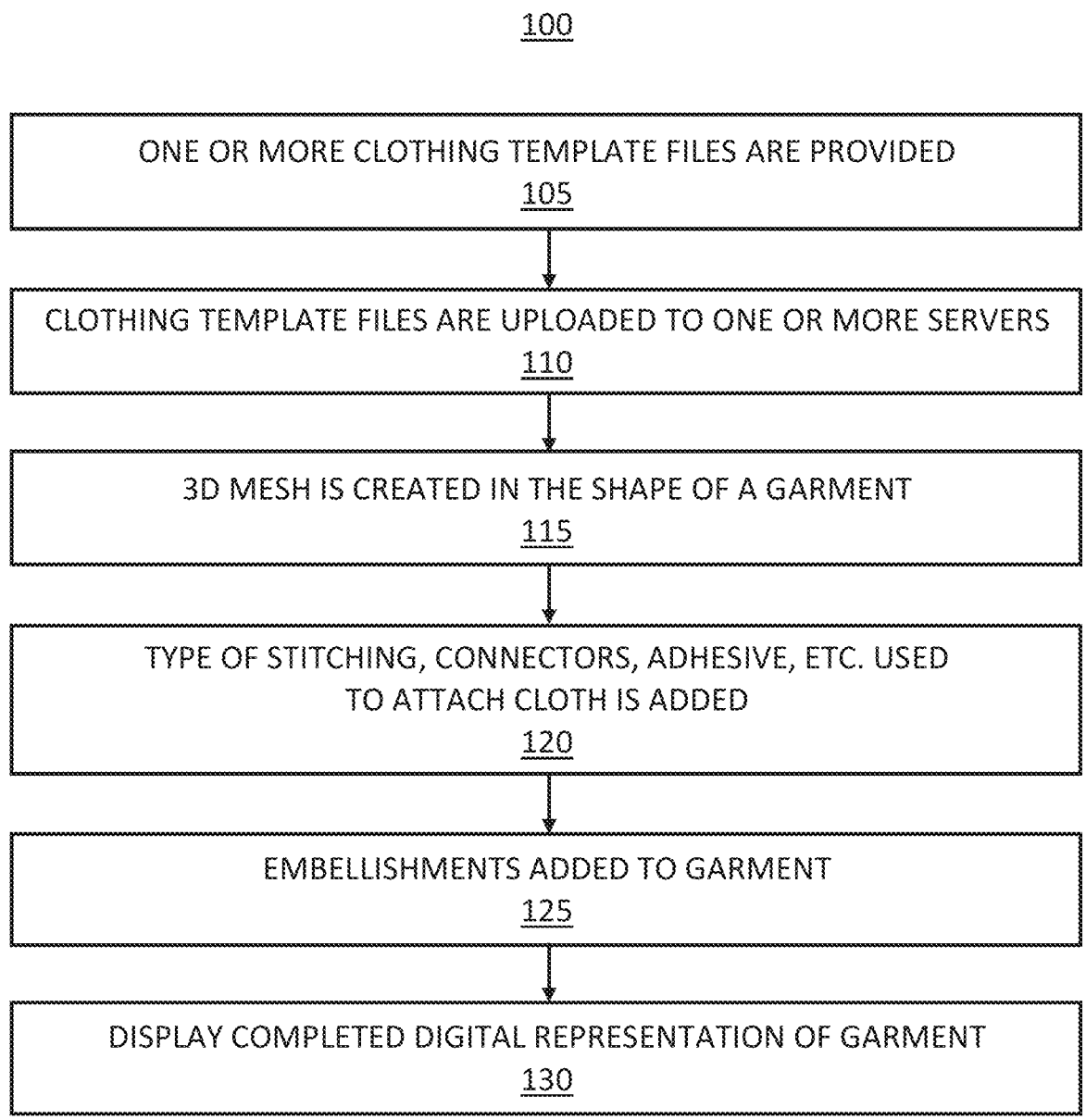
FIGS. 1 show a flowchart of a method for generating digital clothing and a digital representation of a user, or "avatar", according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

The solution presented in the present system has been purpose-built for online commerce for the mass consumer. It is designed for massive scale, worldwide application, and sub-second response times, with privacy. According to an embodiment, the solution is cloud-basedand encompasses several critical elements necessary to deliver the above performance. These critical elements include the custom avatar of the user, the smart 3-dimensional e-garment (with all fabric properties infused), and the virtual fitting room. These elements enable enhanced visualization and personalization of the digital clothing and make the user more likely to purchase and retain the clothing. If any of these critical elements are inaccurate, partially present or absent from any solution, it renders the solution ineffective and does not deliver the desired end results, which include, e.g., providing an enhanced customer experience, producing increased conversion, reducing product returns, etc.

Referring now to FIG. 1, a flowchart of a method 100 for generating digital clothing is illustratively depicted, in accordance with an embodiment of the present invention.

Figure 6:
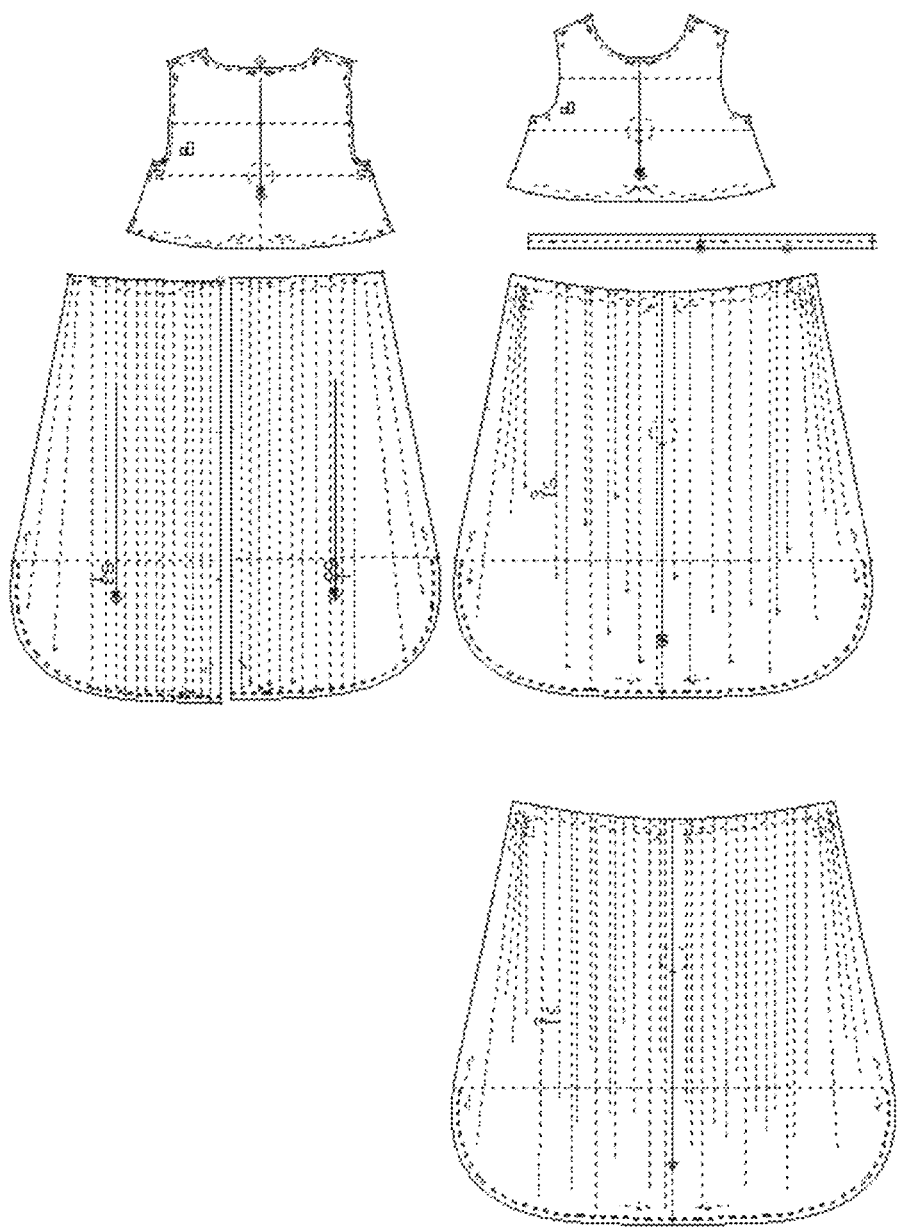
FIG. 6 shows a 2D mapping from a clothing template, according to an embodiment of the present invention.

At step 105 one or more clothing template files, representing one or more garment patterns used to make clothing, are provided. According to an embodiment, these files are provided by clothing manufacturers. These clothing template files include 2-dimensional (2D) mappings of one or more garment patterns. According to an embodiment, the one or more clothing template files are CAD files. An example of such 2D mappings is shown in FIG. 6. At step 110, clothing the one or more clothing template files are uploaded to one or more servers. According to an embodiment, the clothing template files are created before the start of the present method 100. According to an embodiment, the garment patterns are paper garment patterns. According to an embodiment, the pattern for the clothing is automatically determined based on one or more photographs of the clothing.

Figure 7:
FIG. 7 shows a 3D mesh of points in the approximate shape of a finished clothing product, according to an embodiment of the present invention.

At step 115, a 3D mesh, comprised of a plurality of polygons in a 3D space, is created in the shape of a garment. According to an embodiment, after uploading the one or more clothing template files, one or more of the 2D mappings are fit together, forming the 3D mesh in the approximate shape of a finished clothing product, as shown in FIG. 7. According to an embodiment, each 3D mapping is intended to be used to create a form made from one or more textiles. According to an embodiment, the 3D mesh is formed from the analyzation of one or more images. At step 120, information/data related to these textiles is incorporated into each point of the 3D mesh in the appropriate areas for each type of textile. This information/data may include, e.g., information related to texture, elasticity, resistance to movement, flow, the effect of gravity on the textile, and/or any other suitable information. According to an embodiment, the shape and size of the polygons in the 3D mesh affects the physical properties of the garment. For example, the more polygons, the more movement and/or multi-directional movement the garment has.

Figure 8:
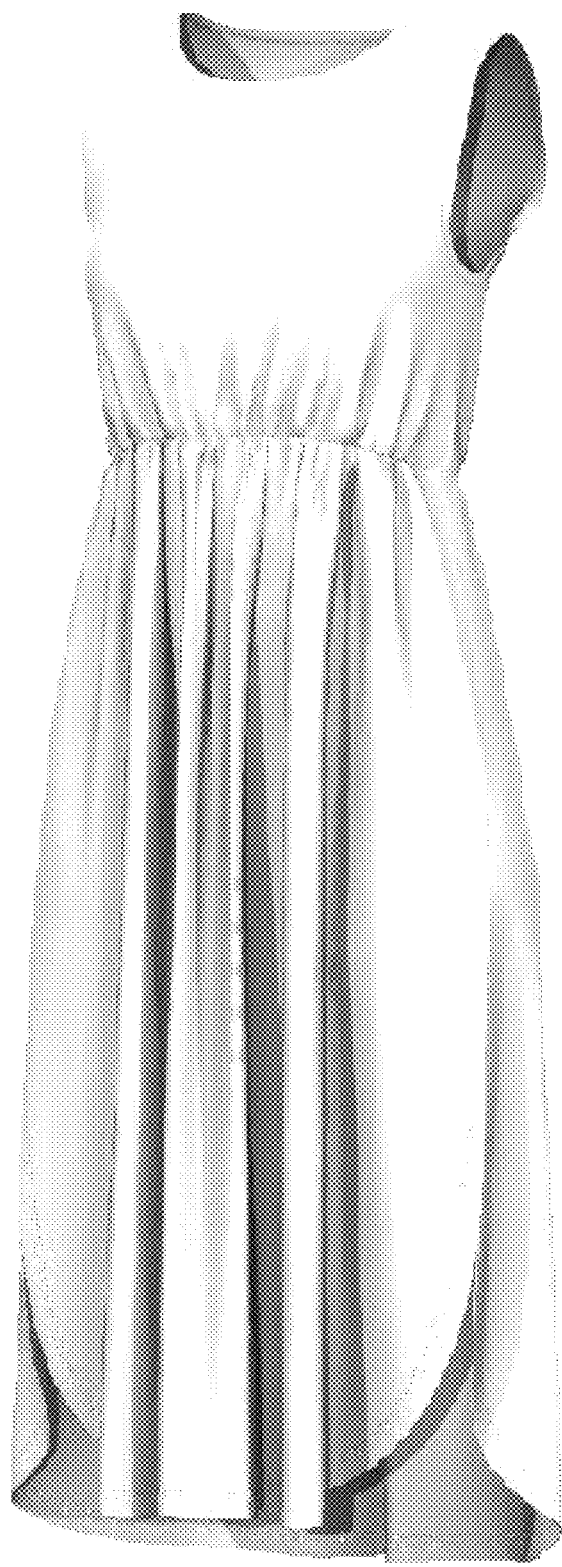
FIG. 8 shows a completed digital representation of a particular piece of clothing having no embellishments, according to an embodiment of the present invention.

According to an embodiment, at step 120, the type of stitching, connectors, adhesive, etc. used to attach two or more pieces of cloth is collected and incorporated into the 3D mesh. This information is used to digitally stitch/secure two or more digital pieces of cloth together. According to an embodiment, the collection of digital cloths form a completed 3D mesh a piece of clothing, as shown in FIG. 8.

Figure 9:
FIG. 9 shows a completed digital representation of a particular piece of clothing having embellishments, according to an embodiment of the present invention.

At step 125, embellishments are added to the garment, making the garment appear as though it is an actual textile, as shown in FIG. 9. According to an embodiment, the embellishments include colors, imagery, zippers, tags, buttons, thread color, trim, snaps, collar stays, logos, and/or any other suitable embellishments. According to an embodiment, a fabric is scanned. According to an embodiment, color may be infused to the digital garment by standard color codes, proprietary color codes, etc. This scan is then used to colorize the digital garment. According to an embodiment, the digital garment incorporates how light bounces off of the fabric. Once all of the embellishments are added, a completed digital representation of a particular piece of clothing, as shown in FIG. 9, is displayed, at step 130.

Figure 2:
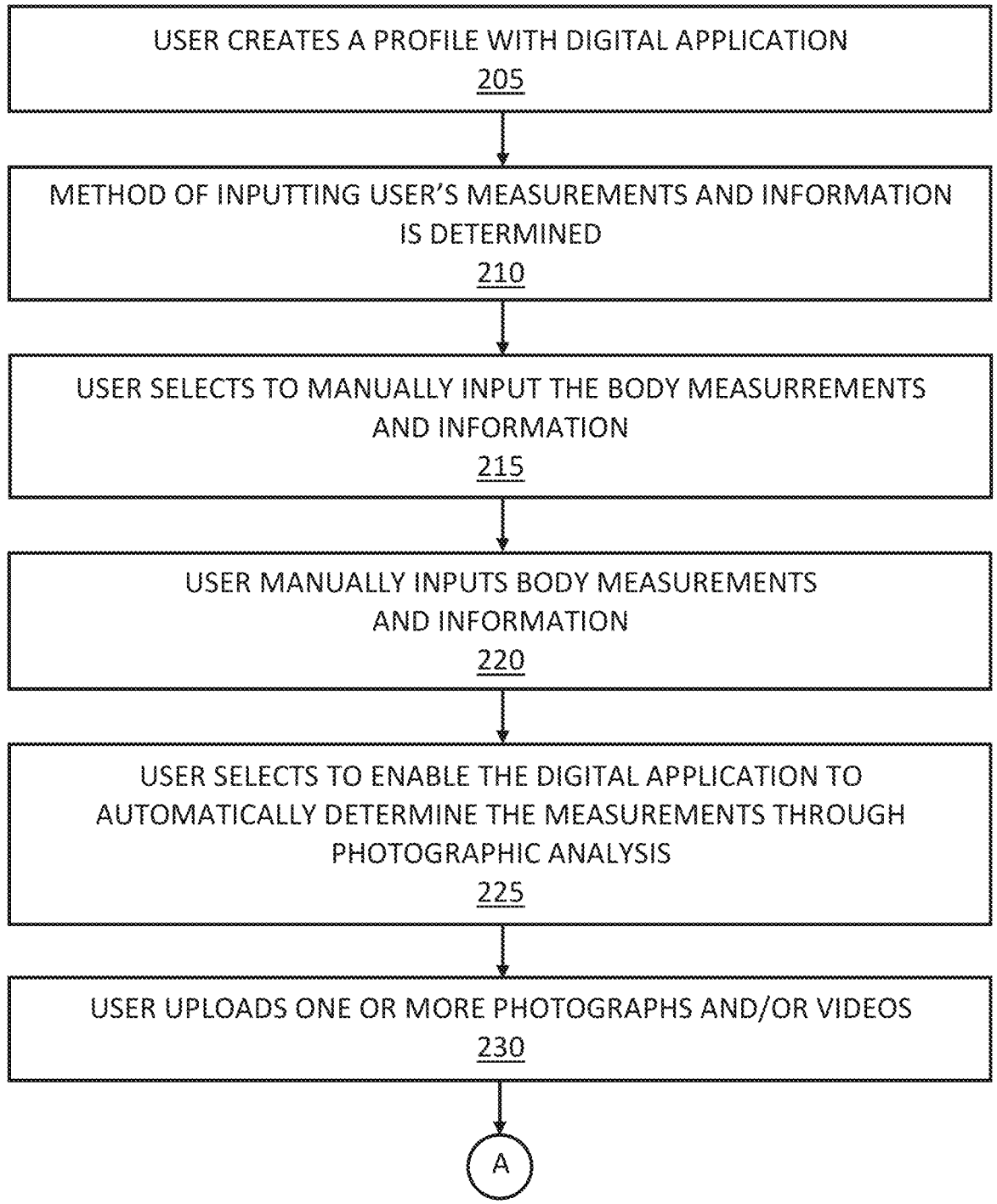
FIGS. 2-4 show a flowchart of a method for generating customized digital clothed avatars, according to an embodiment of the present invention.
Figure 3:
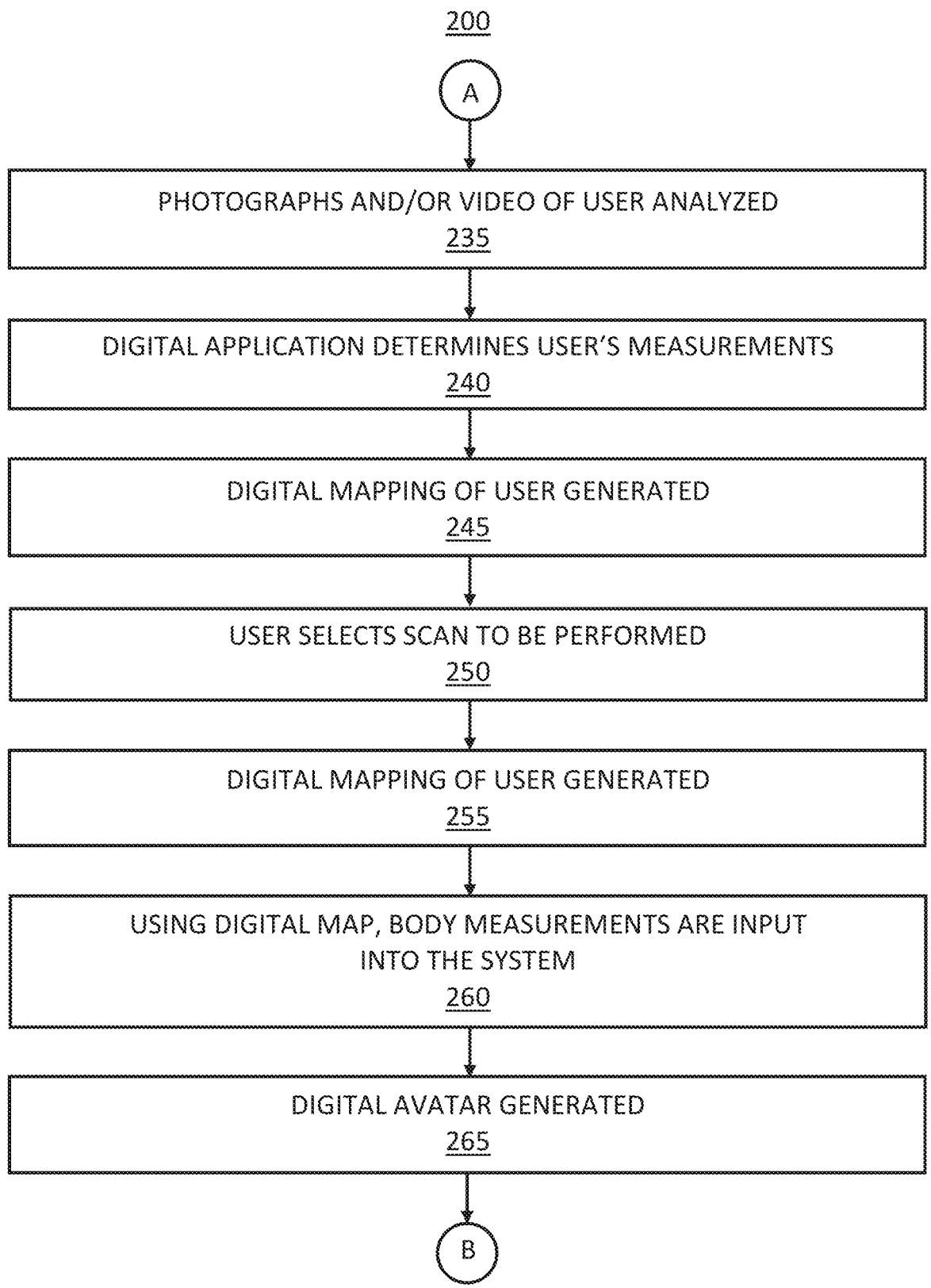
Figure 4:
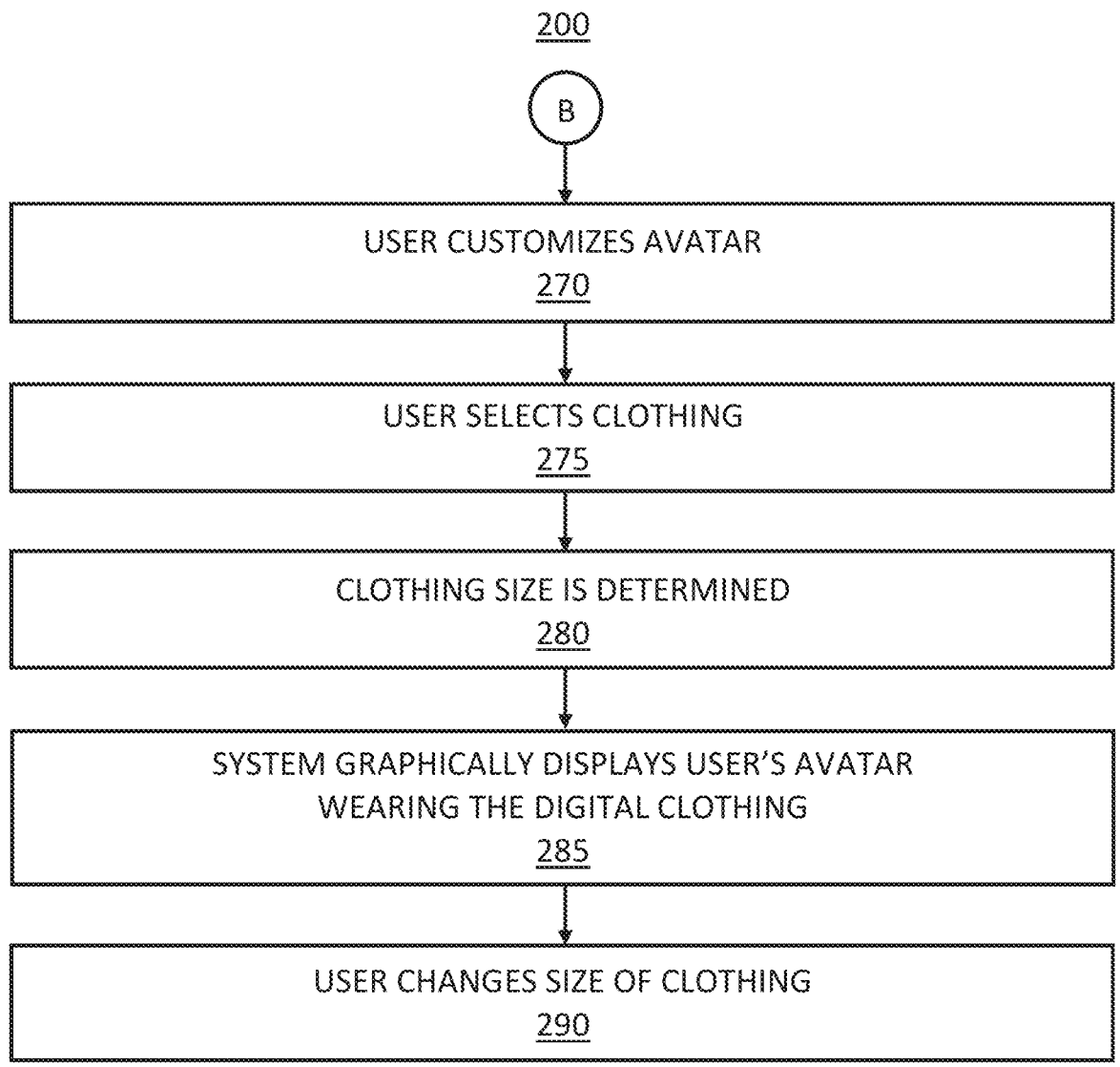

Referring now to FIGS. 2-4, a flowchart of a method 200 for generating customized digital clothed avatars is illustratively depicted, in accordance with an embodiment of the present invention.

At step 205, a user creates a profile with a digital application configured to enable the user's measurements and information to be saved. It is noted that the digital application may take the form of a downloadable digital application, a website, and/or any other suitable digital application. According to an embodiment, creating the profile using the application includes inputting personal information about the user. This information may include, e.g., age, profession, place of residence, ethnicity, height, weight, hair color, eye color, income, and/or any other relevant personal information about the user. According to an embodiment, the digital application is openable on an electronic device 302 (shown in FIG. 5) such as, e.g., a laptop computer, a desktop computer, a tablet computer, a smartphone, a smart TV, a virtual reality (VR) viewer, a consumer graphical user interface in a retail location, and/or any other suitable electronic device 302.

Once the user creates a user profile, the user's body measurements and information are input into the application. At step 210, the method of inputting the user's measurements and information is determined.

At step 215, the user selects to manually input the body measurements and information. According to an embodiment, if the user is going to manually input the body measurements and information, the user selects the option on the digital application for manually inputting body measurements and information. According to an embodiment, the user is then presented with various fillable measurement fields to fill in. After measuring the required areas, the user, as step 220, manually inputs the measurements and information into the fillable portions on the digital application.

At step 225, the user selects to enable the digital application to automatically determine the measurements through photographic analysis. According to an embodiment, at step 230, the user uploads one or more photographs and/or videos of the user to the digital application. According to an embodiment, the one or more photographs and/or videos of the user are taken at various angles to the user.

At step 235, the digital application and/or the accompanying hardware and/or software analyzes the one or more photographs or video to determine the shape of the user in 3D space. According to an embodiment, in order to more accurately determine the shape of the user in 3-dimensional space, the one or more photographs or video should include the user in a partial or complete state of undress (or wearing garments that are positioned close to the body surface of the user), since clothing may alter the outward appearance of the user.

At step 240, the digital application determines the user's approximate measurements using the determined 3D shape of the user. According to an embodiment, the user, at step 245, is able to review and/or alter these automatically generated measurements.

At step 250, the user selects to have a laser scan or infrared (IR) scan or millimeter wave scan of the user performed. At step 255, using one or more beams and one or more rangefinders, a digital mapping of the user is generated. Using this digital map of the user's body, the user's body measurements, at step 260, are generated and input into the system. According to an embodiment, this may be completed at any suitable location (e.g., a "scanning booth" and/or any device that could suitably generate it). According to an embodiment, the scanning may comprise scanning one or more photographs (or video) of the user, and using these photographs (or video) to determine one or more measurements of the user. According to an embodiment, the user may be able to aim an image-capturing and/or video-capturing device around the user's body, wherein the images and/or video are then used to determine one or more measurements for the avatar.

At step 265, after the measurements are input into the digital application, the digital application generates a digital avatar which closely conforms to the user's measurements.

It is noted that, according to some embodiments of the present invention, the user may be presented with one or more of the options for inputting body measurements. It is further noted that, according to some embodiments, the user may not be presented with an option to change the designated method of inputting body measurements. It is also noted that, according to some embodiments, the user is enabled to edit one or more of the input body measurements.

According to an embodiment, once the avatar is generated, the user, at step 270, customizes the avatar. According to an embodiment, this customization may include, e.g., customizing facial features, hair (style, color, etc.), skin tone, musculature, piercings, jewelry, tattoos, and/or any other suitable features. According to an embodiment, the user is able to incorporate his/her face and/or skin tone onto the avatar. According to an embodiment, some or all embellishments of the avatar pertaining to the identity of the user (e.g., skin tone, face, musculature, etc.) may be stored on the user's local device and not on the server.

At step 275, the user selects a piece of clothing form a selection of one or more pieces of clothing. According to an embodiment, this selection may take the form of selecting a piece of clothing from a list of clothing items on a webpage/app/etc. According to an embodiment, this selection may take the form of scanning, or receiving signals from, a barcode/RFID tag/etc. on a piece of clothing. According to an embodiment, this selection may take the form of taking an image of a piece of clothing. It is noted, however, that other suitable methods of selecting the piece of clothing may also be incorporated while maintaining the spirit of the present invention.

According to an embodiment, the system suggests clothing pieces for the user to try on their avatar. According to an embodiment, these suggestions are based on data compiled from the user, from similar users, and/or other third parties.

Figure 10:
FIG. 10 shows a screenshot of a user's avatar wearing a selected clothing piece using a graphical user interface, according to an embodiment of the present invention.

According to an embodiment, the selected clothing piece has two or more sizes available. Once the piece of clothing is selected, the system, at step 280, determines which clothing size to select for the user to view, based on the user's body measurements and/or avatar. Once the clothing size is determined, the system, at step 285, graphically displays the user's avatar on a graphical user interface wearing the selected clothing piece (as shown in FIG. 10) in the selected size or a size selected by the system. The clothing includes the 3D mesh that incorporates the information/data pertaining to the textiles, and includes the information/data pertaining to the colors and reflectivity of the clothing. Due to these properties, the digital clothing has a realistic look as it relates to color, texture, light, and response to movement and the user's body size and shape. This enables the user to view the clothing piece in a virtual fitting room. According to an embodiment, the user, at step 290, is able to change the size of the clothing piece to determine what the piece would look like on the user's avatar in a different size.

According to an embodiment, the user is able to rotate and/or move the avatar while the avatar is wearing the digital piece of clothing. According to an embodiment, the present system is capable of displaying multiple clothing pieces on the user's avatar at the same time, enabling the user to evaluate ensembles or layers of clothing and accessories. For example, but not limited to, shirt and pants at the same time, whether tucked in or not, whether there is a jacket on top, etc.

According to an embodiment, the system of the present method has harnessed virtual reality/augmented reality (VR/AR) technology and/or artificial intelligence (AI) technology to create the first true "virtual fitting room" for online apparel shopping via an end-to-end comprehensive solution. According to an embodiment, the system creates a custom experience for the user, mimicking a physical in-store fitting room, providing an online shopper with a rich, immersive shopping experience. According to an embodiment, this is delivered via the privacy of the user's personal device in a frictionless way, without changing their behavior or requiring additional equipment. By eliminating steps required in order to receive an accurate representation of how clothing will behave on a user's frame, the present system improves upon the existing technologies. Furthermore, according to an embodiment, the user may incorporate VR, AR, and/or AI to view their avatar in selected clothing pieces while at specific surroundings. For example, according to an embodiment, the user is able to view himself/herself in ski clothing on a ski slope.

According to an embodiment, the "virtual fitting room" experience is delivered via a widget (Try-It-On button) embedded on the product page(s) of a brand e-commerce site. First, the shopper creates a personal, 3D, accurate replica of themselves ("Avatar") via an app in seconds (the Avatar is portable across brands and is easily changeable as measurements change). The shopper clicks on the garment they wish to try on, and their personal Avatar is shown wearing the best fitting size (no need for them to know their size beforehand). The shopper can then size up/down, change colors/prints, see themselves from different angles, zoom in for detail, etc. before deciding to purchase or not. So, while the solution helps with an initial size, the shopper is then able to use it to interactively adjust this to match their personal sense of style and how they like the garment on themselves (e.g. looser/tighter, details like where the neckline hits, sleeve length, hem line, etc.). This fully interactive and immersive experience, gives them confidence in their eventual selection and improves upon the existing technologies.

The user may be able to search for clothing using an Internet search engine. According to an embodiment, once the clothing is found using the search engine, the user selects a "Try It On" button, which enables the user to view the clothing on the user's avatar.

It is noted that not every embodiment of the present invention includes every step in methods 100 and 200. It is further noted that, according to various embodiments of the present invention, the steps in methods 100 and 200 may be in an alternate order to that shown in FIGS. 2-5. According to various embodiments, each step in methods 100 and/or 200 may not need to be performed in every iteration.

Figure 5:
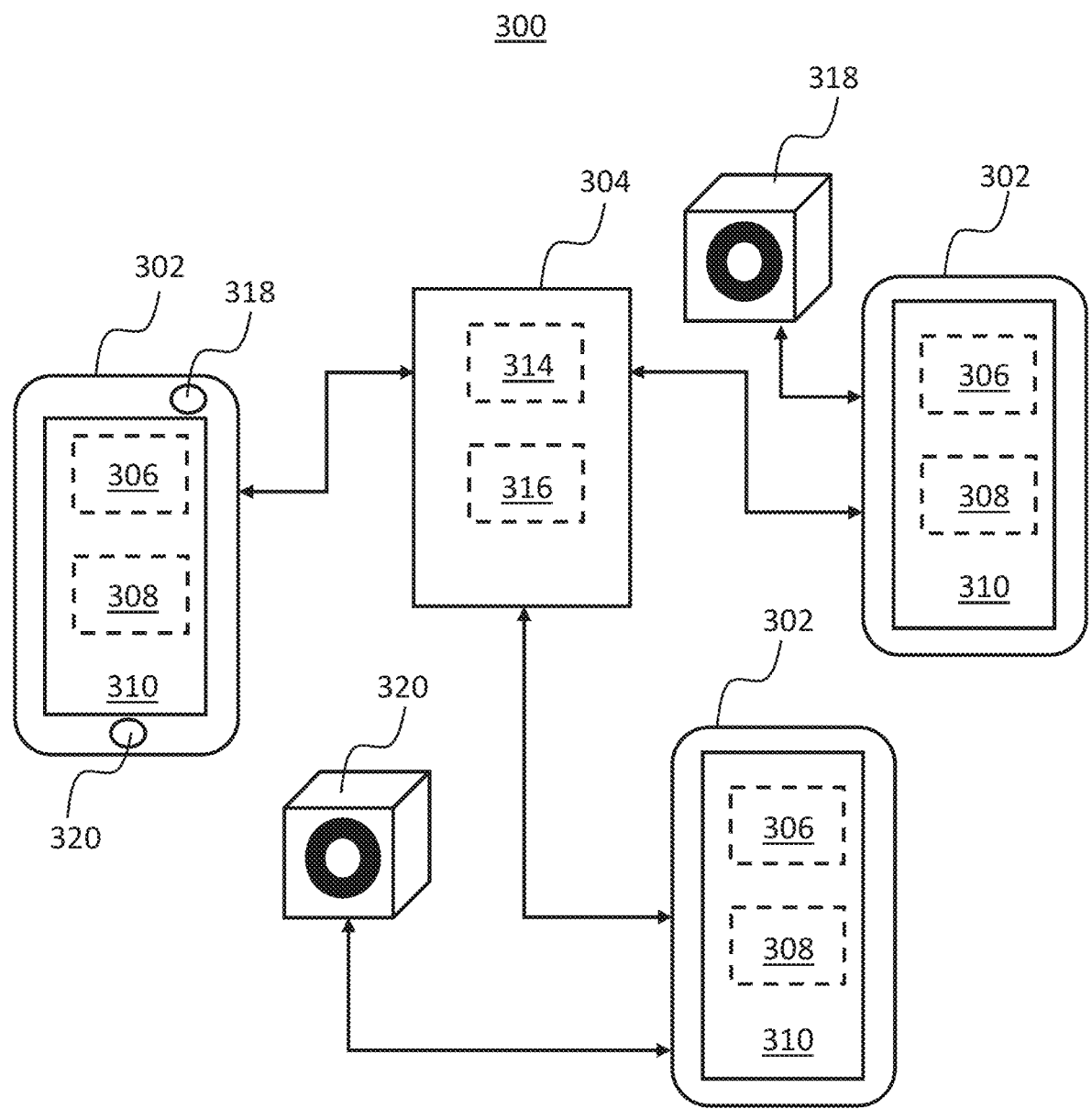
FIG. 5 shows a system for generating customized digital clothed avatar, according to an embodiment of the present invention.

Referring now to FIG. 5, a system 300 for generating customized digital clothed avatars is illustratively depicted, in accordance with an embodiment of the present invention. According to an embodiment, system 300 is configured to perform one or more of the steps described methods 100 and 200 as shown in FIGS. 1-4.

According to an embodiment, the system 300 includes one or more electronic devices 302 and one or more servers 304 coupled to each other and/or to each of the one or more electronic devices 302. According to an embodiment, the one or more electronic devices 302 each include a processor 306, a memory 308, and a graphical user interface 310. According to an embodiment, the graphical user interface 310 includes a display. According to an embodiment, the one or more electronic devices 302 include a desktop computer, a tablet computer, a smartphone, a smart TV, a VR viewer, a consumer graphical user interface in a retail location, and/or any other suitable electronic device 302.

According to an embodiment, the one or more servers 304 are coupled to each other and/or to each of the electronic devices 302 via a wired and/or wireless connection. According to an embodiment, each of the one or more servers 304 includes a processor 314 and a memory 316.

According to an embodiment, the system 300 further includes a means for scanning the user in order to determine one or more body measurements of the user. According to an embodiment, this means may include, e.g., a still-frame and/or motion camera 318 and/or a laser or IR scanner 320. According to an embodiment, the camera 318 and/or the scanner 320 may be a component of the electronic device 302 and/or may be externally coupled to the electronic device 302. According to an embodiment, the means for scanning the user may be incorporated into the one or more electronic devices 302 and/or may be a separate device.

According to an embodiment, the memory 316 on the one or more servers 304 is configured to store the one or more clothing templates. The processor 314 is configured to form the completed clothing matrices from the one or more clothing templates and the accompanying data, which is also stored on the memory 316.

Systems, Devices and Operating Systems

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and/or a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), Amazon Look, eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony Play Station® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller; Intel's MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, lighting, video monitors and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields.

In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component includes several tables. A Users table may include fields such as, but not limited to: user_id, ssn, dob, first_name, last_name, age, state, address_firstline, address_secondline, zipcode, devices_list, contact_info, contact_type, alt_contact_info, alt_contact_type, and/or the like to refer to any type of enterable data or selections discussed herein. The Users table may support and/or track multiple entity accounts. A Clients table may include fields such as, but not limited to: user_id, client_id, client_ip, client_type, client_model, operating_system, os_version, app_installed_flag, and/or the like. An Apps table may include fields such as, but not limited to: app_ID, app_name, app_type, OS_compatibilities_list, version, timestamp, developer_ID, and/or the like.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for generating digital clothing on custom digital avatars, comprising:
   providing one or more garment template files comprising a plurality of two-dimensional (2D) garment patterns;
   generating, from the plurality of 2D garment patterns, a 3-dimensional (3D) representation of one or more garments, the 3D representation comprising a 3D mesh, wherein the 2D garment patterns are fit together to form the 3D mesh in an approximate shape of a finished clothing product,
   wherein data related to textiles is incorporated into each point of the 3D mesh in areas of the 3D mesh corresponding to each type of textile, wherein the data related to textiles includes information related to texture, elasticity, resistance to movement, flow, and an effect of gravity on the textile,
   wherein the 3D representation of the one or more garments is comprised of a number of polygons; and
   wherein the generating further includes adding one or more embellishments to the 3D representations, wherein the one or more embellishments are selected from the group comprising: zippers; tags; buttons; thread color; trim; snaps; and collar stays;
   inputting one or more data points for a user,
      wherein the one or more data points include body measurements of the user, wherein one or more light beams and one or more rangefinders are used to generate a digital mapping of the user which is used to generate the user's body measurements;
   generating, using a processor, a custom digital avatar for the user,
      wherein the custom digital avatar is configured to approximately conform to the one or more data points;
   selecting, using a graphical user interface, one or more garments embodied in the 3D representation; and
   digitally displaying, using the graphical user interface, the selected one or more garments on the custom digital avatar.

2. The method as recited in claim 1, wherein the generating further includes:
   uploading one or more clothing templates to one or more servers.

3. The method as recited in claim 2, wherein the generating further includes:
   digitally interconnecting two or more of the one or more clothing templates.

4. The method as recited in claim 1, further comprising:
   creating, using the graphical user interface, a user profile on a digital application,
      wherein the one or more data points are input into the user profile.

5. The method as recited in claim 1, wherein the one or more data points further include data points selected from the group consisting of: facial features; hair style; hair color; skin tone; musculature; piercing s ; jewelry; and tattoos.

6. The method as recited in claim 1, wherein the inputting further includes:
   uploading one or more images or video files;
   analyzing the one or more images or video files; and determining the one or more data points based on the analysis of the one or more images or video files.

7. The method as recited in claim 1, wherein the inputting further includes:
manually inputting, using the graphical user interface, the one or more data points.

8. The method as recited in claim 1, wherein the inputting further includes:
scanning a body of the user using a laser scanner or an infrared scanner; and
determining the one or more data points based on the scan.

9. A system for generating digital clothing on custom digital avatars, comprising:
one or more servers, comprising:
a memory, configured to:
receive and store one or more data points for a user,
wherein the one or more data points include body measurements of the user; and
a processor, configured to:
receive one or more garment template files comprising a plurality of two-dimensional (2D) garment patterns;
generate, from the plurality of 2D garment patterns, a 3-dimensional (3D) representation of one or more garments, the 3D representation comprising a 3D mesh,
wherein the 2D garment patterns are fit together to form the 3D mesh in an approximate shape of a finished clothing product,
wherein data related to textiles is incorporated into each point of the 3D mesh in areas of the 3D mesh corresponding to each type of textile, wherein the data related to textiles includes information related to texture, elasticity, resistance to movement, flow, and an effect of gravity on the textile,
wherein the 3D representation of the one or more garments is comprised of a number of polygons; and wherein the 3D representations further includes one or more embellishments that are selected from the group comprising: zippers; tags; buttons; thread color; trim; snaps; and collar stays;
wherein one or more light beams and one or more rangefinders are used to generate a digital mapping of the user which is used to generate the body measurements of the user;
generate a custom digital avatar for the user,
wherein the custom digital avatar is configured to approximately conform to the one or more data points including the body measurements of the user; and
one or more electronic devices, comprising:
a processor;
a memory; and
a graphical user interface including a display, the graphical user interface being configured to:
select one or more garments embodied in the 3D representation; and
digitally display the selected one or more garments on the custom digital avatar.

10. The system as recited in claim 9, wherein the memory is further configured to receive and store one or more clothing templates.

11. The system as recited in claim 10, wherein the processor if further configured to digitally interconnect two or more of the one or more clothing templates.

12. The system as recited in claim 9, wherein the one or more electronic device is configured to enable a user to create, using the graphical user interface, a user profile on a digital application,
wherein the one or more data points are input into the user profile.

13. The system as recited in claim 9, wherein the one or more data points further include data points selected from the group consisting of: facial features; hair style; hair color; skin tone; musculature; piercings; jewelry; and tattoos.

14. The system as recited in claim 9, wherein the one or more servers is configured to:
receive one or more images or video files;
analyze, using the processor, the one or more images or video files; and
determine the one or more data points based on the analysis of the one or more images or video files.

15. The system as recited in claim 9, wherein the graphical user interface is further configured to enable the user to manually input the one or more data points.

16. The system as recited in claim 9, wherein the one or more electronic devices further includes:
a laser scanner or an infrared scanner configured to scan a body of the user, and
wherein the one or more servers is further configured to determine the one or more data points based on the scan.

* * * * *